(12) United States Patent
Kolzenburg et al.

(10) Patent No.: US 8,332,834 B2
(45) Date of Patent: Dec. 11, 2012

(54) GENERATION OF A PROGRAM CODE IN A LOAD FORMAT AND PROVISION OF AN EXECUTABLE PROGRAM CODE

(75) Inventors: Ulrich Kolzenburg, München (DE); Stephan Spitz, München (DE); Wolfgang Effing, Forstern (DE)

(73) Assignee: Giesecke & Devrient GmbH, München (DE)

( * ) Notice: Subject to any disclaimer, the term of this patent is extended or adjusted under 35 U.S.C. 154(b) by 1171 days.

(21) Appl. No.: 11/792,517

(22) PCT Filed: Dec. 1, 2005

(86) PCT No.: PCT/EP2005/012854
§ 371 (c)(1), (2), (4) Date: Apr. 28, 2008

(87) PCT Pub. No.: WO2006/061141
PCT Pub. Date: Jun. 15, 2006

(65) Prior Publication Data
US 2009/0044172 A1 Feb. 12, 2009

(30) Foreign Application Priority Data
Dec. 6, 2004 (DE) .......................... 10 2004 058 882

(51) Int. Cl.
*G06F 9/44* (2006.01)
(52) U.S. Cl. ..................................................... 717/162
(58) Field of Classification Search .................. None
See application file for complete search history.

(56) References Cited

U.S. PATENT DOCUMENTS

| | | | |
|---|---|---|---|
| 5,916,308 A * | 6/1999 | Duncan et al. | 719/331 |
| 6,182,283 B1 * | 1/2001 | Thomson | 717/153 |
| 6,405,316 B1 | 6/2002 | Krishnan et al. | |
| 6,668,325 B1 | 12/2003 | Collberg et al. | |
| 6,792,612 B1 | 9/2004 | Baentsch et al. | |
| 2001/0034818 A1 | 10/2001 | May et al. | |

(Continued)

FOREIGN PATENT DOCUMENTS

EP   1 335 281   8/2003

(Continued)

OTHER PUBLICATIONS

Sun Microsystems, Inc., "Virtual Machine Specification, Java Card ™ Platform, Version 2.2.1," Santa Clara, California (Oct. 2003), 23 total pages including pp. i-xvi, 1-4, 41, 42, and 91.

(Continued)

*Primary Examiner* — Philip Wang
(74) *Attorney, Agent, or Firm* — Martine Penilla Group, LLP

(57) ABSTRACT

In a method for generating program code in a load format for a portable data carrier, a pseudo library is used, which differs from the library located on the data carrier in such a way that at least some of the internal workings of the library located on the data carrier are absent or hidden or masked in the pseudo library. In a method for providing executable program code in the portable data carrier, the program code in load format is linked relative to the library located on the data carrier. A device and a computer program product have corresponding features. The invention provides secure, privacy-safeguarding technology, which allows the generation of program code in a load format for a portable data carrier and the provision of executable program code in the portable data carrier.

21 Claims, 3 Drawing Sheets

U.S. PATENT DOCUMENTS

| | | | |
|---|---|---|---|
| 2001/0047512 A1* | 11/2001 | Szewerenko et al. | 717/10 |
| 2004/0015911 A1* | 1/2004 | Hinsley et al. | 717/147 |
| 2004/0015914 A1* | 1/2004 | Renouf | 717/148 |
| 2004/0139341 A1 | 7/2004 | Yamaguchi et al. | |
| 2004/0148613 A1 | 7/2004 | Yach et al. | |

FOREIGN PATENT DOCUMENTS

| | | |
|---|---|---|
| JP | 2002-132364 | 5/2002 |
| JP | 2003-140758 | 5/2003 |
| JP | 2003-337629 | 11/2003 |
| JP | 2004-038394 | 2/2004 |
| JP | 4739465 | 5/2011 |

OTHER PUBLICATIONS

W. Wilson Ho et al., "An Approach to Genuine Dynamic Linking," *Software Practice & Experience*, vol. 21(4) (Apr. 1991), pp. 375-390.

Notice of Grounds for Rejection issued in Japanese Application No. 2007-544782, Japan Patent Office, Nov. 8, 2011.

* cited by examiner

GENERATION OF A PROGRAM CODE IN A LOAD FORMAT AND PROVISION OF AN EXECUTABLE PROGRAM CODE

BACKGROUND OF THE INVENTION

1. Field of the Invention

The invention relates in general to the field of portable data carriers and the creation of software for such data carriers. In particular, the invention relates to the field of generating program code for a portable data carrier, loading the program code into the data carrier and providing the program code for execution by a processor of the data carrier. For the purpose of the present document, portable data carriers may take the form of chip cards (smart cards) or of compact chip modules and in some embodiments of the invention also of resource-limited systems in other types of construction.

2. Description of Related Art

In recent years portable data carriers have become increasingly powerful in the course of continuous technical development. This is true both of the computing power made available by the hardware and the storage space and of the functions provided by the operating system. Modern portable data carriers exhibit a functionality allowing the post-loading of program code—i.e. the loading of program code during operation of the data carrier. Data carriers into which application programs may be post-loaded have already been known for some time. At present, however, data carriers are also being developed which allow post-loading of parts of the operating system, e.g. of drivers, libraries or functional modules. It is to be expected that this post-loading option will develop in future into an important part of flexible operating systems for portable data carriers.

In general, important factors in relation to portable data carriers are the aspects of security and spy protection, because portable data carriers are often used for security-critical applications and considerable damage could arise as a result of unauthorized use or spying. A particular problem of data carriers which allow post-loading of program code is that the internal workings of the data carrier must as far as possible not be exposed. In particular, it must be ensured that the external developer of the program code to be post-loaded does not require or cannot acquire information about the internal structure and internal program structures of the data carrier. Thus, for example, platform-dependent functions of the data carrier must as far as possible remain hidden, even if the program code to be post-loaded ultimately makes use of these functions.

SUMMARY OF THE INVENTION

An object of the invention is to solve the above-stated problem wholly or in part. In particular, the invention is intended to provide secure, privacy-safeguarding technology, which allows the generation of program code in a load format for a portable data carrier and the provision of executable program code in the portable data carrier.

According to the invention, this object is achieved, wholly or in part, by a method of generating program code in a load format, which is intended to be loaded into a portable data carrier during operation thereof and executed by a processor of the data carrier and, during said execution, to use functions of a library located on the data carrier, the method having the following steps performed outside the data carrier:

generation of program code in an object code format, and
  at least partial linking of the program code in object code format relative to a pseudo library, in order to obtain the program code in load format, the pseudo library differing from the library located on the data carrier in such a way that at least some of the internal workings of the library located on the data carrier are absent or hidden or masked in the pseudo library.

Further according to the invention, this object is achieved, wholly or in part, by a method of providing executable program code in a portable data carrier, the executable program code being set up so as to use functions of a library located on the data carrier during execution by a processor of the data carrier, the method having the following steps performed by the processor of the data carrier:

loading of program code in a load format during operation of the data carrier, the program code in load format having been linked at least partially relative to a pseudo library, which differs from the library located on the data carrier in such a way that at least some of the internal workings of the library located on the data carrier are absent or hidden or masked in the pseudo library, and
  linking of the program code in load format relative to the library located on the data carrier, in order to obtain the executable program code.

The invention further comprises a program development system, a portable data carrier, and a computer program product.

The fundamental principle underlying the invention is that of only providing a pseudo-library outside the data carrier, this pseudo-library differing from a library located on the data carrier in that at least some of the internal workings of the library located on the data carrier are absent or hidden or masked in the pseudo library. Only the pseudo library—and optionally the associated documentation—need be made accessible to an external program developer. In this way, information from which third parties could possibly draw undesirable conclusions about the internal workings of the data carrier is kept secret. In this way, the invention allows secure development of post-loadable program code even by third parties, for example by independent software houses or industrial users of data carriers.

The program code in object code format is linked at least in part relative to the pseudo library. This means, in particular, that in some embodiments of the invention the program code in load format may still comprise symbolic information of the type conventionally contained in object code format. In other embodiments, in contrast, a program code fully linked relative to the pseudo library is generated in load format.

A further linking process takes place on the data carrier, this taking the form, in some embodiments, of a dynamic linking process. This linking process may take place, in different embodiments, at the loading time or at the running time or partly at the loading time and partly at the running time. The linking process performed on the data carrier takes place relative to the private library located on the data carrier.

In some embodiments, the linking performed outside the data carrier is virtual linking relative to virtual functions of the pseudo library. Accordingly, in some embodiments virtual function calls in the program code in load format may be replaced within the data carrier by actual function calls of the library located on the data carrier.

Embodiments of the invention are also provided in which the program code in load format has branch tables or reference tables, which are filled with entries referring to the real library only upon linking on the data carrier. Provision may be made in particular—but not only—in such embodiments for virtual function calls to be resolved in the library located on the data carrier. This may take place at the loading time or at the running time or partly at the loading time and partly at the running time.

In some embodiments of the invention, the pseudo library provides a call interface, which differs from the call interface of the library located on the data carrier. In particular, the call interface provided by the pseudo library may be a virtual call interface.

In order to achieve a high level of security against corruption of the program code and against undesired post-loading of unauthorized program code, authentication data are created in some embodiments and checked upon loading of the program code.

In some embodiments, flexible and automatic detection of the post-loaded program code by the operating system and/or application programs of the data carrier is made possible in that the functions provided by the program code are entered in an administrative unit of the data carrier.

The program code generated and loaded into the data carrier may be, for example, an application program or a kernel module. Provision is made in some embodiments for the program code to be native program code. Binary code should here in particular be regarded as native program code, said binary code being executable by the processor of the data carrier without the intermediary of interpretation and without a virtual machine.

The computer program product according to the invention comprises program commands for implementing the method according to the invention or program commands which have been generated by the method according to the invention. Such a computer program product may be a physical medium, e.g. a semiconductor memory or a floppy disc or a CD-ROM. The computer program product may, however, also be a non-physical medium, e.g. a signal transmitted over a computer network. In particular, the computer program product may contain software for a program development system or a portable data carrier or be used in conjunction with the production or initialization or personalization or the operation of a portable data carrier.

The device according to the invention may in particular be a program development system or a portable data carrier. In some further embodiments the computer program product and/or the device comprise features which correspond to those mentioned in the present description and/or those mentioned in the dependent method claims.

BRIEF DESCRIPTION OF THE DRAWINGS

Further features, objects and advantages of the invention are apparent from the following description of an exemplary embodiment and a plurality of alternative embodiments. In the schematic drawings.

DETAILED DESCRIPTION OF EMBODIMENTS OF THE INVENTION

Figure 1:
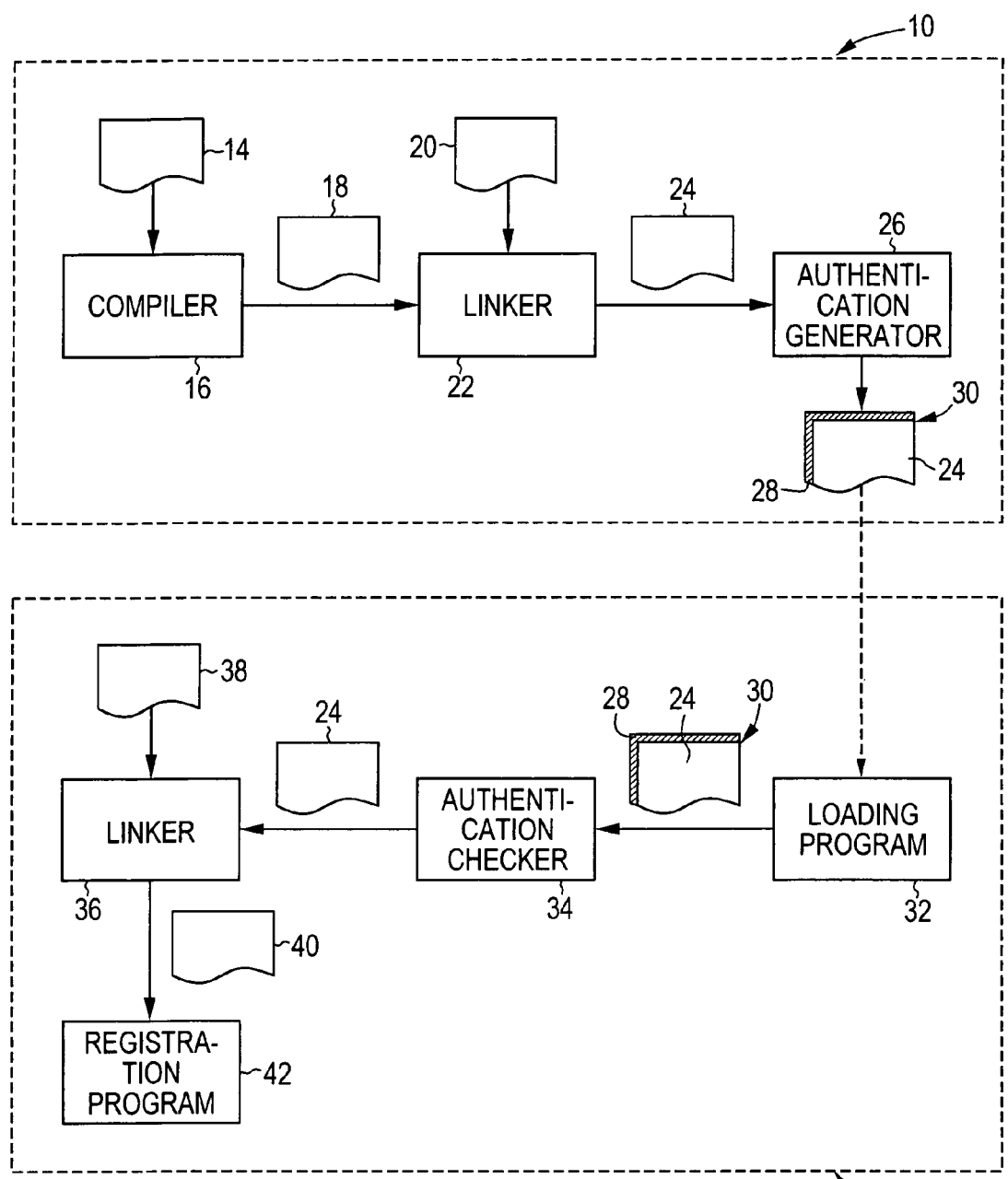
FIG. 1 is a conceptual diagram of the data structures and data processing stages in a program development system and a data carrier according to an exemplary embodiment of the invention.

FIG. 1 is a schematic representation of a program development system 10 and a portable data carrier 12. The program development system 10 may take the form of a conventional personal computer or workstation with suitable software. In the present exemplary embodiment, the data carrier 12 is a chip card or a chip module with hardware known per se. In particular, the data carrier 12 contains a single-chip microcontroller with a processor, a plurality of memory fields configured for different technologies and an interface circuit for wired or wireless communication.

In the exemplary embodiment shown in FIG. 1, generation of the program code starts from a source text 14, which is translated by a compiler 16 into a corresponding program code 18 in an object code format. In the program development system 10 a pseudo library 20 is available, which will be looked at in more detail below. From the program code 18 present in object code format and the pseudo library 20 a linker 22 generates an at least partially linked program code 24 in a load format.

In order to secure the program code 24 against inadvertent or malicious corruption, an authentication generator 26 is used, which generates authentication data 28—e.g. a suitable checksum for the program code 24. The program code 30 in load format secured by the authentication data 28 forms the result of the development process performed with the assistance of the program development system 10. This program code 30 is stored for subsequent use.

The program code 30 may be loaded into the data carrier 12 during operation thereof. The loading process may take place, for example, on the end customer's premises or in conjunction with the production or initialization or personalization of the data carrier 12. The program code 30 is present in this case in the program development system 10 or an initializing or personalizing device or an end customer's terminal and is transferred to the data carrier 12. During the loading process the data carrier 12 is in operation. This should be understood to mean that the program code 30 is actively processed and modified during the loading process by the processor of the data carrier 12.

FIG. 1 indicates with a dashed arrow that the secured program code 30 in load format is received—optionally via one of the above-mentioned intermediate stations—into the data carrier 12 by a loading program 32. An authentication checker 34 ensures that the program code 30 is uncorrupted and has been provided with the authentication data 28 by an authorized station. If the check is passed, the program code 24 in load format is linked by a linker 36 relative to a library 38 stored in the data carrier 12. This procedure performed by the dynamic linker will be looked at in more detail below.

The linker 36 generates executable program code 40, which is then available for execution by the processor of the data carrier 12. In some embodiments the executable program code 40 is an application program (application) for the data carrier 12. In contrast, in the exemplary embodiment described herein, the executable program code 40 is a kernel module of the data carrier 12, i.e. for example a part of the operating system, a driver or a library. The kernel module may, for example, provide a driver for memory management or a crypto library or functionalities for communication with various interfaces—e.g. USB, wireless, TCP/IP.

The functions of the executable program code 40 are provided to the operating system of the data carrier 12 and the application programs stored on the data carrier 12. In some embodiments flexible detection of the loaded functionality takes place. To this end, the executable program code 40—in particular if it is a kernel module—makes available a previously specified interface. In addition, the exemplary embodiments described herein provide for entry of the program code 40 by means of a registration program 42 in an administrative unit of the data carrier 12 with the provided functions. This administrative unit may, for example, be a registration file (registry) or another data structure of the data carrier 12.

Figure 2:
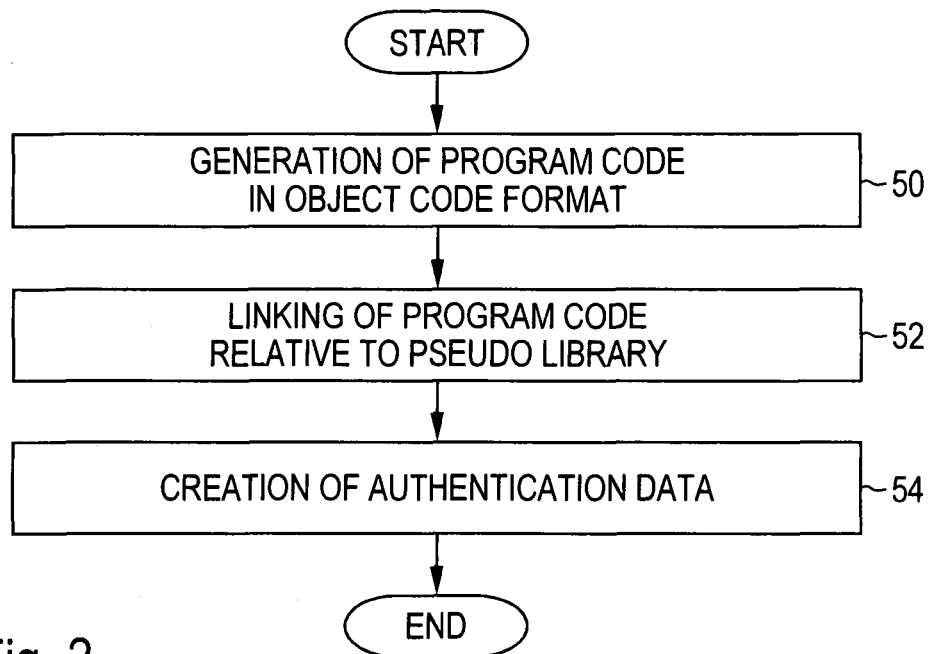
FIG. 2 is a flow chart of a method performed in the program development system of FIG. 1 for generating program code in a load format.

FIG. 2 again shows the method sequence in the program development system 10. In step 50 the program code 18 is generated in object code format. Step 52 relates to linking of the program code 18 relative to the pseudo library 20, in order to obtain the unsecured program code 24 in load format. In step 54 the authentication data 28 and the secured program code 30 in load format are finally generated.

Figure 3:
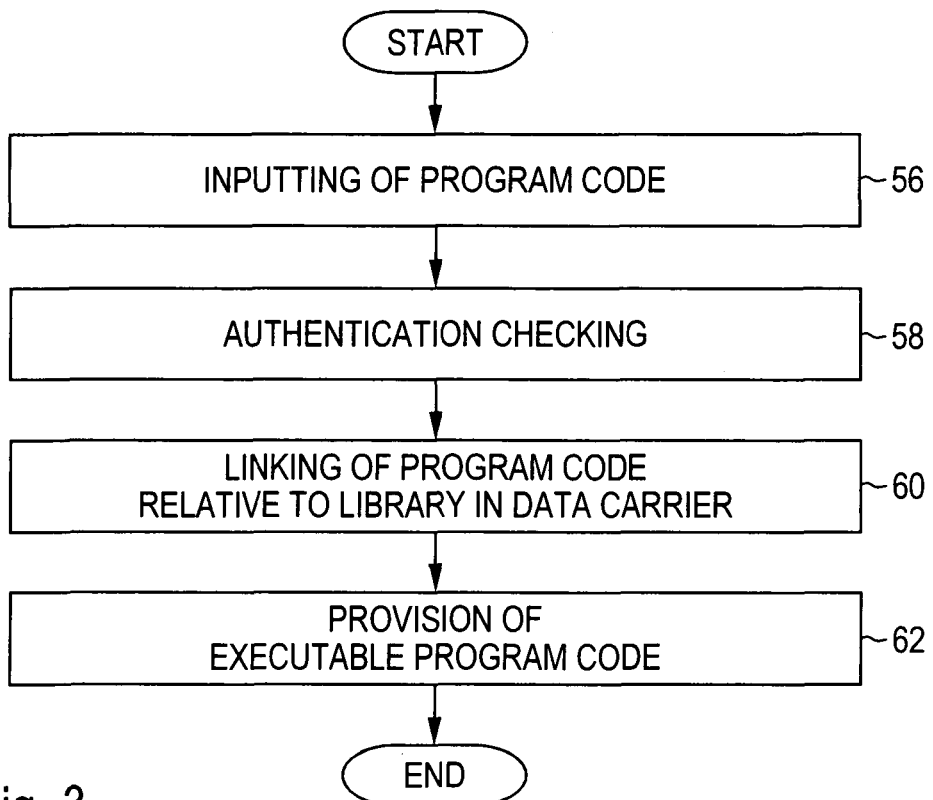
FIG. 3 is a flow chart of a method performed in the data carrier of FIG. 1 for providing executable program code.

The flow chart shown in FIG. 3 summarizes the method steps performed in the data carrier 12. Inputting of the secured program code 30 in step 56 and authentication checking in step 58 are followed in step 60 by linking of the program code 24 relative to the library 38 stored in the data carrier 12, in order to obtain the executable program code 40. The executable program code 40 is provided for execution in step 62 and is optionally entered into the administrative unit of the data carrier 12.

An essential part of the exemplary embodiments described herein are the two linking processes in steps 52 and 60. In the first linking process in step 52, which is performed by the linker 22, the pseudo library 20 (dummy library) is used. The pseudo library 20 differs from the library 38 stored in the data carrier 12 in particular in that the pseudo library 20 does not contain the actual functions of the library 38 stored on the data carrier 12, but rather merely functions which are here designated as "virtual functions".

The linking process outside the data carrier 12 thus takes place virtually, i.e. relative to virtual functions of the pseudo library 20 instead of relative to the actual functions of the library 38 contained in the data carrier 12. In other words, linking takes place relative to a virtual call interface of the pseudo library 20 instead of relative to the real call interface of the library 38 in the data carrier 12. The internal workings of the data carrier 12, namely in particular the internal functions and internal functionalities of the library 38, therefore remain hidden. These internal functions and functionalities could not be determined even by an analysis of the pseudo library 20.

Figure 4:
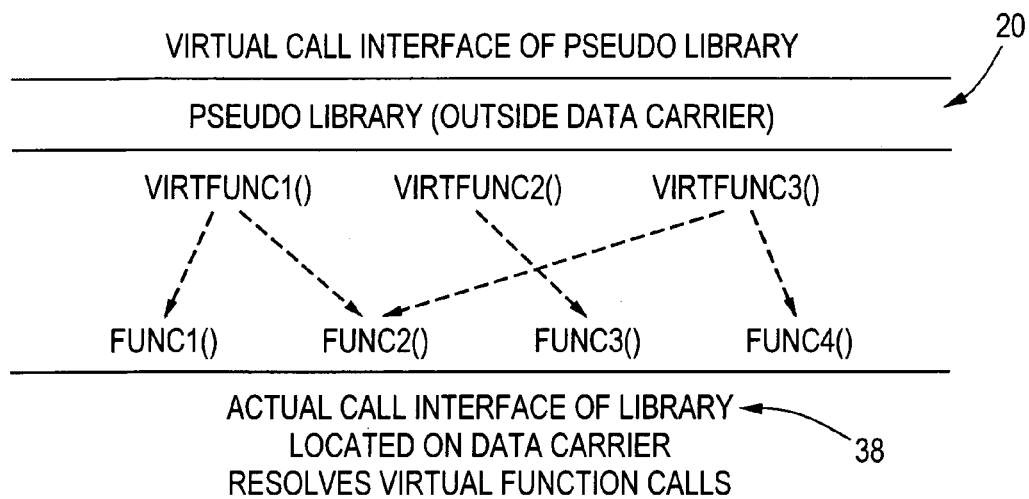
FIG. 4 is an exemplary representation of the relationship between a library located on the data carrier and a pseudo library.

The relationship just described between the pseudo library 20 and the library 38 contained in the data carrier 12 is explained in FIG. 4 with reference to an example. The pseudo library 20 provides a virtual call interface with for example the functions VirtFunc1, VirtFunc2 and VirtFunc3. The call interface of the library 38 with the actual functions of the data carrier 12 is stored only on the data carrier 12.

The actual call interface of the library 38 contained in the data carrier 12 resolves the virtual function calls and provides, for example, the internal functions Func1, Func2, Func3 and Func4. Linking of the program code 18 in step 52 by the linker 22 takes place relative to the pseudo library 20, which makes available only the call interface. In contrast, actual resolution of the references does not take place until step 60 on the data carrier 12. During this process the virtual functions VirtFunc 1-VirtFunc3 are replaced by the actual functions Func 1-Func4. This is illustrated by the dashed arrows in FIG. 4.

All in all, it is thus ensured that the program code 40 executed on the data carrier 12 may use platform-dependent and/or private functions. Through use of the pseudo library 20, however, the conversion of the external functions known to the program developer into the platform-dependent functions, which takes place only in the data carrier 12, does not need to be revealed. This measure brings about a significant increase in the security of the data carrier 12, even if the latter allows loading of native program code—e.g. application programs and drivers.

It goes without saying that the details of the above description are intended merely as examples of possible embodiments of the present inventions. Further modifications, in particular with regard to the linking processes 52, 60 performed outside the data carrier 12 and in the data carrier 12 and to the respective contents of the pseudo library 20 and of the library 38 located in the data carrier 12, are possible and obvious to a person skilled in the art.

The invention claimed is:

1. A method of generating program code in a load format, which is intended to be loaded into a portable data carrier during operation thereof and executed by a processor of the data carrier and, during said execution, to use functions of a private library located on the data carrier, wherein the data carrier is configured as a smart card or a chip module,
   the method having the following steps performed outside the data carrier by a program development system comprising a personal computer or a workstation:
   generation of program code in an object code format, and at least partial linking of the program code in the object code format relative to a pseudo library, in order to obtain the program code in the load format, the pseudo library differing from private library located on the data carrier in such a way that at least some of the internal functions of private library located on the data carrier are absent or hidden or masked in the pseudo library,
   wherein the private library located on the data carrier is not accessible at the program development system outside the data carrier.

2. A method according to claim 1, wherein the linking is virtual linking relative to virtual functions of the pseudo library.

3. A method according to claim 1, wherein authentication data are created so as to secure the program code in the load format against corruption.

4. A method of providing executable program code in a portable data carrier, the executable program code being set up so as to use functions of a private library located on the data carrier during execution by a processor of the data carrier, wherein the data carrier is configured as a smart card or a chip module,
   the method having the following steps performed by the processor of the data carrier:
   loading of program code in a load format during operation of the data carrier, the program code in the load format having been linked at least partially relative to a pseudo library, which differs from the private library located on the data carrier in such a way that at least some of the internal functions of the private library located on the data carrier are absent or hidden or masked in the pseudo library, and
   linking of the program code in the load format relative to the library located on the data carrier, in order to obtain the executable program code,
   wherein the private library located on the data carrier is not accessible from outside the data carrier.

5. A method according to claim 4, wherein the linking is dynamic linking.

6. A method according to claim 4, wherein, during linking, virtual function calls in the program code in the load format are replaced by actual function calls of the private library located on the data carrier.

7. A method according to claim 4, wherein the program code in the load format is secured by authentication data, and the executable program code is only provided for execution after a successful authentication check.

8. A method according to claim 4, wherein the functions provided by the executable program code are entered in an administrative unit of the data carrier.

9. A method according to claim 4, wherein the program code in the load format has been generated by a method having the following steps performed outside the data carrier:
generation of program code in an object code format, and
at least partial linking of the program code in the object code format relative to the pseudo library, in order to obtain the program code in the load format.

10. A method according to claim 1, wherein the pseudo library provides a call interface, which differs from a call interface of the private library located on the data carrier.

11. A method according to claim 10, wherein the call interface provided by the pseudo library is a virtual call interface.

12. A method according to claim 4, wherein the pseudo library provides a call interface, which differs from a call interface of the private library located on the data carrier.

13. A method according to claim 12, wherein the call interface provided by the pseudo library is a virtual call interface.

14. A method according to claim 1, wherein virtual function calls are resolved in the private library located on the data carrier.

15. A method according to claim 4, wherein virtual function calls are resolved in the private library located on the data carrier.

16. A method according to claim 1, wherein the program code is one of an application program and a kernel module and native program code and a native program code application program and a native program code kernel module.

17. A method according to claim 4, wherein the program code is one of an application program and a kernel module and native program code and a native program code application program and a native program code kernel module.

18. A program development system comprising a personal computer or a workstation, which is set up to perform a method of generating program code in a load format, which is intended to be loaded into a portable data carrier during operation thereof and executed by a processor of the data carrier and, during said execution, to use functions of a private library located on the data carrier, wherein the data carrier is configured as a smart card or a chip module,
the method having the following steps performed by the program development system:
generation of program code in an object code format, and
at least partial linking of the program code in the object code format relative to a pseudo library, in order to obtain the program code in the load format, the pseudo library differing from the private library located on the data carrier in such a way that at least some of the internal functions of the private library located on the data carrier are absent or hidden or masked in the pseudo library,
wherein the private library located on the data carrier is not accessible at the program development system outside the data carrier.

19. A portable data carrier, which is set up to perform a method of providing executable program code within the data carrier, the executable program code being set up so as to use functions of a private library located on the data carrier during execution by a processor of the data carrier, wherein the data carrier is configured as a smart card or a chip module,
the method having the following steps performed by the processor of the data carrier:
loading of program code in a load format during operation of the data carrier, the program code in the load format having been linked at least partially relative to a pseudo library, which differs from the library located on the data carrier in such a way that at least some of the internal functions of private library located on the data carrier are absent or hidden or masked in the pseudo library, and
linking of the program code in the load format relative to the private library located on the data carrier, in order to obtain the executable program code,
wherein the private library located on the data carrier is not accessible from outside the data carrier.

20. A computer program product, which comprises a plurality of program commands for controlling a program development system, the plurality of program commands being stored on a physical medium, the program commands being set up so as to cause the program development system to perform a method of generating program code in a load format, which is intended to be loaded into a portable data carrier during operation thereof and executed by a processor of the data carrier and, during said execution, to use functions of a private library located on the data carrier, wherein the data carrier is configured as a smart card or a chip module,
the method having the following steps performed by the program development system:
generation of program code in an object code format, and
at least partial linking of the program code in the object code format relative to a pseudo library, in order to obtain the program code in the load format, the pseudo library differing from the private library located on the data carrier in such a way that at least some of the internal functions of the private library located on the data carrier are absent or hidden or masked in the pseudo library,
wherein the private library located on the data carrier is not accessible at the program development system outside the data carrier.

21. A computer program product, which comprises a plurality of program commands for controlling a portable data carrier, the plurality of program commands being stored on a physical medium, the program commands being set up so as to cause the portable data carrier to perform a method of providing executable program code within the portable data carrier, the executable program code being set up so as to use functions of a private library located on the data carrier during execution by a processor of the data carrier, wherein the data carrier is configured as a smart card or a chip module,
the method having the following steps performed by the processor of the data carrier:
loading of program code in a load format during operation of the data carrier, the program code in the load format having been linked at least partially relative to a pseudo library, which differs from the private library located on the data carrier in such a way that at least some of the internal functions of the private library located on the data carrier are absent or hidden or masked in the pseudo library, and
linking of the program code in the load format relative to the private library located on the data carrier, in order to obtain the executable program code,
wherein the private library located on the data carrier is not accessible from outside the data carrier.

* * * * *